United States Patent Office 2,888,421
Patented May 26, 1959

2,888,421
FILM FORMING AQUEOUS COLLOIDAL DISPERSIONS CONTAINING ALIPHATIC NITROALCOHOL AND METHOD FOR PREPARING SAME

Edgar M. Adams and Robert L. Johnson, Midland, Mich., assignors to The Dow Chemical Company, Midland, Mich., a corporation of Delaware No Drawing. Application July 1, 1957
Serial No. 668,902

15 Claims. (Cl. 260—29.7)

This invention relates to improved aqueous colloidal dispersions. It is particularly concerned with compositions comprising synthetic latexes and a method for making such compositions.

Synthetic latexes have found widespread application in the protective coating field. In such usage, the latex or a composition containing it is applied to masonry, metal or wood surfaces whereby films are formed which tend to adhere to the solid surface and protect the latter against marring and weathering. The latexes commonly are modified by the addition of pigments and other agents to provide latex paint compositions which have desirable properties as regards ease of application, ease of clean-up, self-sealing, alkali resistance and odor. The synthetic latexes are also employed as saturants for papers to improve such properties as tear resistance.

Certain problems have been encountered in the storage and application of synthetic latexes and compositions in which they are employed. For example, the synthetic latexes contain stabilizers and emulsifiers to maintain the polymer in the dispersed state. Many commonly employed stabilizers and emulsifiers are organic in nature and subject to attack by microorganisms. When the latexes are employed in latex paint formulations, they are modified with other additaments such as thickeners, pigment dispersants and stabilizers which are also subject to attack by bacteria and fungi. The resultant microbiological activity frequently results in undesirable alterations in the viscosity of the latex paint system and unfavorably affects its spreading and odor characteristics.

In commercial latex and latex paint formulations, various preservatives have been employed to prevent attack by microorganisms. To accomplish such control with phenols and their salts it has been found necessary to maintain the latex compositions at a pH of 9 or higher. However, to minimize viscosity changes caused by hydrolytic breakdown of common protein components, prevent detinning of containers and permit general flexibility in manufacture and use, it is desirable that latex compositions be maintained at lower pH levels. Thus, the phenols and phenolates do not represent the ultimate as preservatives. Other preservatives such as organic mercury compounds, on the other hand, are not only hazardous because of toxicity but unfavorably affect color stability in certain formulations. Furthermore, certain preservatives undergo diminution in activity or reduction in killing power upon storage or standing on the shelf. This is of particular importance in latex paints which may be subject to subsequent infection by opening of containers, insertion of brushes, exposure to dust and other sources. Certain other preservatives frequently have adverse effects on the colloidal latex system when an amount sufficient to provide adequate protection is added.

Many preservatives are unsuitable in latexes and latex paints since they have been found to affect the films cast therefrom or affect the brushing and spreading characteristics. Further, with certain preservatives such as phenolic agents, a relatively high concentration is required which contributes to the problems of water sensitivity and spotting which are frequently encountered when films cast from present latex and latex paints are subjected to washing, spattering or to conditions which lead to condensation of water on coated surfaces. The desirability of the provision of improved synthetic latex and latex containing compositions and of methods for avoiding the problems inherent in the applications of such compositions, is evident.

It is an object of the present invention to provide for improved compositions of aqueous colloidal dispersions comprising synthetic latexes. A further object is to provide synthetic latexes characterized by properties of resistance to microbial attack and degradation. A further object is to provide an improved method for rendering compositions comprising synthetic latexes resistant to microbial attack and degradation. A still further object is to provide a method for producing latex paint compositions which are resistant to the attack of microorganisms. Other objects will become apparent from the following specification and claims.

According to the present invention, it has been discovered that improved aqueous colloidal dispersions comprising synthetic latexes are obtained when there is incorporated into the synthetic latex a minor and effective proportion of an aliphatic nitroalcohol. These aliphatic nitroalcohols are soluble in water and polar solvents in the amounts employed and when added to aqueous colloidal dispersions comprising synthetic latex impart thereto a property of resistance to microbially induced degradation even when added in amounts considerably less than that now employed with known preservatives. By the expression "aliphatic nitroalcohol" is meant a compound characterized by having one nitro group and at least one hydroxyl group on different saturated carbon atoms and having no aromatic or cyclic nucleus in its configuration. By the expression "saturated carbon atom" is meant that the remaining three valences of the carbon atom to which the nitro or hydroxyl group is attached are joined to hydrogen or to different carbon atoms in single bonded linkages. The carbon atoms holding the nitro group and hydroxyl group may be primary, secondary or tertiary. The carbon atoms holding the nitro group and hydroxyl group may be joined to each other or through a carbon chain which may be interrupted by a hetero atom such as an amino nitrogen.

The preferred aliphatic nitroalcohols for the practice of this invention are those characterized by having from 2 to 4 carbon atoms of the molecule in a linear chain and having a nitro group and at least one hydroxyl group substituted on adjacent carbon atoms

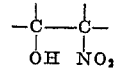

When the nitroalcohol has two hydroxyl groups, it is preferred that each hydroxyl group be on a carbon atom adjacent to that holding the nitro group, e.g.

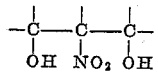

Examples of these preferred nitroalcohols are 1-nitro-2-butanol, 2-nitro-1-butanol, 2-nitroethanol, 3-nitro-2-butanol, 2-methyl-2-nitro-1-propanol, 2-methyl-1-nitro-2-propanol, 2-methyl-2-nitro-1,3-propanediol, 2-ethyl-2- nitro-1,3-propanediol, 3-methyl-3-nitro-2-butanol and 2-nitro-1,3-propanediol.

When the aliphatic chain is interrupted by a hetero atom, it is not required that the nitro and the hydroxyl groups be attached to adjacent carbon atoms. Thus, 2,2 - dimethyl - 3 - (2 - methyl - 2 - nitropropyl)amino-1-propanol is as effective as nitroalcohols containing hydroxyl and nitro groups on adjacent carbon atoms.

Other aliphatic nitroalcohols suitable for the practice of this invention are the nitroalcohols having as many as 7 to 8 carbon atoms in the aliphatic carbon chain. These nitroalcohols, as in the preferred species have a hydroxyl and nitro group substituted on adjacent carbon atoms. Examples of these nitroalcohols include 2-nitro-3-hexanol, 3-nitro-2-pentanol, 3-nitro-4-heptanol, 2-methyl-2-nitro-3-hexanol, 2-nitro-1-pentanol, 3-nitro-2-hexanol, 5-nitro-4-octanol, 2-methyl-2-nitro-1-butanol, 3-methyl-3-nitro-2-pentanol, 3-methyl-3-nitro-4-heptanol, 3-methyl-2-nitro-1-butanol, 4-methyl-3-nitro-2-pentanol, 2-methyl-3-nitro-4-heptanol, 2-nitro-2-propyl-1, 3-propanediol, 2-nitro-2-isopropyl-1, 2-propanediol and 3-nitro-3-methylpentanediol.

A number of desirable properties characterize the aqueous colloidal dispersions provided by this invention. For example, all of the latex and latex paint compositions of the present invention are found to be resistant to microbial deterioration and without adverse effects on the color or other desirable properties of the latex. This protective action is observed on repeated inoculation of latex compositions with organisms normally present in water, soil and contaminated latex. Furthermore, this action is observed throughout the neutral and alkaline pH range. In addition, the free films and/or coatings formed from such compositions exhibit stability against degradation such as discoloration, surface breakdown, peeling and water spotting suffered on exposure to heat, light and/or water that is frequently encountered in films formed from compositions modified by adding known preservatives. Thus, with latex and latex paint compositions containing aliphatic nitroalcohols, films and coatings may be formed in which the desirable properties of the films and coatings formed from latex compositions containing no preservative are retained. Furthermore, latex compositions of this invention have the same non-hazardous properties as the latex compositions containing no added preservative.

The expression "synthetic latex" as herein employed is intended to mean any aqueous colloidal dispersion of polymers of polymerizable olefinically unsaturated monomers. Examples of such polymeric materials are copolymers of monoethylenically unsaturated compounds such as styrene and acrylonitrile with a conjugated diolefin such as butadiene; homopolymers and copolymers of styrene, acrylic and methacrylic esters; vinyl halide and vinylidene halide monomers; and homopolymers and copolymers of vinyl acetate. The synthetic latexes are aqueous dispersions usually containing in addition to the polymer, an emulsifying agent and buffers. They may, in addition, contain other non-polymeric additives such as a plasticizer or stabilizer. Typical of the synthetic latexes with which this invention is concerned are those described in U.S. Patent No. 2,498,712. Emulsifying agents which may be employed include sodium oleate, sodium sulfate esters of higher alcohols, or sodium sulfonate of alkylated naphthalenes. Buffers which are oftentimes used include sodium bicarbonate and sodium tetraborate.

The term "latex paint" as herein employed refers to an aqueous colloidal dispersion containing a synthetic latex composition as above defined to which has been added a pigment. The term "pigment" denotes colored as well as white pigments and is understood to be inclusive of mineral products used as fillers and extenders. Suitable pigment materials are well-known and good results have been obtained when employing the lithopones, titanium dioxide, barium sulfate, calcium carbonate, clays, mica, talc, silica and the like in various combinations and proportions depending on the end use for which the paint is designed. Colored pigments and dyes which have been found compatible in these compositions include benzylidene yellow, cadmium yellow, carbon blacks, chromium oxides and hydroxides, Hansa yellow, iron oxides, toluidine toners, sienna, umber and ultramarine blues. Suitable pigment dispersants such as tetrasodium pyrophosphate, lecithin and gum arabic may be employed. In addition, thickeners and other paint making ingredients may be present in latex paint. These ingredients and latex paint compositions containing them are extensively described in the art, e.g. in U.S. Patent No. 2,498,712. Colloid stabilizers and thickeners which may be used include casein, α-protein, and water soluble cellulose derivatives.

The preferred polymeric materials to be contained in the synthetic latexes in accordance with the present invention are copolymers prepared from 25–75 percent of at least one conjugated aliphatic diolefin and 75–25 percent of at least one vinyl aromatic compound. Typical conjugated diolefins are butadiene and isoprene. Typical vinyl aromatic compounds are hydrocarbons of the benzene series having a vinyl group on a benzene or substituted benzene nucleus such as styrene and vinyltoluene.

The aliphatic nitroalcohols with which the present invention is concerned may be employed in any antimicrobial amount. While good results have been obtained with from 0.002 to 1 percent by weight of the aliphatic nitroalcohol when based on the total wet weight of synthetic latex, the range of from 0.01 to 0.5 percent by weight is preferred. In preparing the improved aqueous colloidal dispersion, the aliphatic nitroalcohol is blended with the synthetic latex by mechanical mixing. The nitroalcohol is usually first dissolved in water, ethanol, 50:50 methanol-water or other suitable solvent and thereafter introduced into the latex with agitation. Good results have been obtained by employing water or alcoholic solutions containing 35 to 50 percent by weight of the aliphatic nitroalcohol.

When the aqueous colloidal dispersion is a latex paint, good results have been obtained when the aliphatic nitroalcohol is employed in an amount of from about 0.03 to 1.0 percent by weight. This percentage by weight is calculated on the basis of the weight of the aliphatic nitroalcohol and the total wet weight of the paint employed. It is preferred that at least 0.05 percent by weight of the nitroalcohol be added to the latex paint. The incorporation of the aliphatic nitroalcohol into the paint may be made at any point in its manufacture. It may be introduced before or after the addition of the pigment dispersion to the latex or added to said dispersion. Conveniently, a solution of the aliphatic nitroalcohol may be blended into the formulated latex paint.

Representative synthetic latexes may be prepared by polymerizing mixtures of suitable monomeric compounds in aqueous emulsion in accordance with known procedures. As described in U.S. Patent No. 2,498,712, the polymerizable compounds, in proportions corresponding to the desired composition of the polymeric product, may be mixed with an aqueous solution of an emulsifying agent and the mixture agitated to effect emulsification. The emulsifying agent is ordinarily employed in amount corresponding to from 0.5 to 5 percent of the weight of the polymerizable organic compounds, but it may be used in smaller or larger proportions. A catalyst such as a peroxide is usually added in amount corresponding to from 0.5 to 4 percent of the weight of the compounds to be polymerized, but is not always required. A buffer may be added if desired. The emulsion is heated in a closed container, generally at temperatures between 50° and 100° C., to effect polymerization. After completing of the polymerization, the property of the resulting polymeric dispersion may be modified, if desired, by the incorporation in the dispersion of other additives such as plasticizers or stabilizers.

An example of synthetic latexes which may be employed is a GRS type latex. A representative latex is an approximately 35 percent aqueous colloidal dispersion containing a copolymer of approximately 50 percent butadiene and 50 percent styrene prepared by emulsion polymerization. This latex may be prepared by charging a reactor with the following:

| | Parts by weight |
|---|---|
| Butadiene | 18.0 |
| Styrene | 18.0 |
| Water | 64.0 |
| Emulsifier (soap flakes) | 1.54 |
| Catalyst (potassium persulfate) | 0.090 |

The mixture is then agitated to effect emulsification and heated at a temperature of 50° C. for 23 hours to cause polymerization. A post-stabilizer (35 percent solution of potassium oleate) is added to the resultant latex in the ratio of 4.71 parts by weight of post stabilizer for every 90 parts by weight of latex and the mixture then heated to steam distill the volatiles and recover an approximately 50:50 styrene-butadiene copolymer latex of 35 percent solids content.

The synthetic latex thus prepared may be employed for the preparation of a paint emulsion. A typical latex paint may be formulated by blending together 69 parts by weight of latex with 100 parts by weight of pigment paste having the following composition:

| Ingredient | Parts by Weight |
|---|---|
| Water | 10.1 |
| Sodium pyrophosphate ($Na_2P_2O_7 \cdot 10H_2O$) | 0.5 |
| Titanium dioxide | 47.0 |
| Lithopone | 13.4 |
| Mica | 6.7 |
| α-Protein (10 percent solution) | 19.1 |
| Pine Oil | 0.8 |
| Tributyl phosphate | 2.5 |

Variations may be made in the above formula as will be apparent to those skilled in the art.

Aliphatic nitroalcohols suitable in the practice of this invention are prepared readily by the reaction of an appropriate nitroalkane with an appropriate aliphatic aldehyde in the presence of a basic catalyst in a manner similar to that described in Industrial and Engineering Chemistry, 32, 34 (1940).

The following examples illustrate the invention but are not to be construed as limiting thereof.

EXAMPLE 1

A commercial GRS-2000 type latex prepared by a method well-known in the art comprising polymerizing an aqueous dispersion containing the following ingredients

| | Parts by weight |
|---|---|
| Styrene | 50 |
| Butadiene | 50 |
| Rosin soap | 5 |
| Potassium persulfate | 0.5-0.6 |
| Normal dodecylmercaptan | 0.45 | and thereafter post-stabilized with 1.5 parts by weight of potassium oleate. The post-stabilized latex of 39-42 percent solids content was modified by adding varying amounts of an aliphatic nitroalcohol to produce modified compositions containing varying concentrations of an aliphatic nitroalcohol. Twenty gram portions of these latex compositions as well as a control were then inoculated with 0.05 milliliter portions of a 24-hour nutrient broth culture of a mixture of eight organisms consisting largely of Pseudomonas, Bacillus and Proteus species and previously isolated from spoiled samples of α-protein, latex and latex paint. The inoculated samples were maintained at about 25° C. for 24 hours after inoculation, then multiple streaks made from these samples on poured nutrient agar plates and the latter incubated at 30° C. for 48 hours. At the end of this period, the plates were examined for microbial growth. The results obtained are set forth in Table I.

Table I

| Nitroalcohol | Concentration in Percent by Weight | Microbial Growth |
|---|---|---|
| 2-Ethyl-2-nitro-1,3-propanediol | 0.25 | None. |
|  | 0.05 | Do. |
| 2-Nitro-1-propanol | 0.25 | Do. |
| Control | None | Heavy. |

EXAMPLE 2

A synthetic GRS-2000 type latex of the composition described in Example 1 was modified by adding various nitroalcohols in a concentration of 0.25 percent by weight of the total weight of latex in the manner described in Example 1. Twenty gram portions of modified as well as unmodified samples were inoculated with 0.05 milliliter portions of a 24 hour nutrient broth culture of the same mixed organisms employed in Example 1, at about 25° C. for 2 weeks. The samples were then streaked, incubated and observed as described in Example 1. The results are set forth in Table II.

Table II

| Nitroalcohol | Microbial Growth |
|---|---|
| 2-Ethyl-2-nitro-1,3-propanediol | None. |
| 2-Nitroethanol | Do. |
| 2-Nitro-1-propanol | Trace. |
| Control | Heavy. |

EXAMPLE 3

In a similar manner, a synthetic GRS-2000 type latex of the composition described in Example 1 was modified by adding various nitroalcohols in varying concentrations. Twenty gram portions of modified as well as unmodified samples were inoculated with 0.05 milliliter portions of a mixed culture of organisms as previously described and maintained at about 25° C. for 1 week. The samples were then streaked, incubated and observed as described in Example 1. The results are set forth in Table III.

Table III

| Nitroalcohol | Concentration | Microbial Growth |
|---|---|---|
| 2-Ethyl-2-nitro-1,3-propanediol | 0.25 | None. |
|  | 0.1 | Do. |
|  | 0.05 | Do. |
| Control | None | Heavy. |

EXAMPLE 4

Synthetic latexes including commercially available latexes produced from various monomers were modified by the addition of an aliphatic nitroalcohol to give a series of latexes containing various concentrations of an aliphatic nitroalcohol based on the total weight of latex. Twenty gram portions of the modified as well as unmodified samples were inoculated with 0.05 milliliter portions of a mixed culture of organisms as previously described and maintained at about 25° C. for 24 hours. Multiple streaks were made on agar plates and the latter incubated at 30° C. for 48 hours and thereafter examined as described in Example 1. The results are set forth in Table IV.

Table IV

| Nitroalcohol | Concentration in Percent by Weight | Latex | Microbial Growth |
|---|---|---|---|
| 2-Ethyl-2-nitro-1,3-propanediol | 0.25 | Hycar 1562 [1] | Trace. |
|  | 0.05 | ___do___ | Do. |
| 2-Nitroethanol | 0.25 | ___do___ | Do. |
| 2-Nitro-1-propanol | 0.25 | ___do___ | Do. |
|  | 0.1 | ___do___ | Do. |
| None (Control) | None | ___do___ | Heavy. |
| 2-Nitro-1-butanol | 0.25 | Geon 576 [2] | Trace. |
|  | 0.25 | ___do___ | None. |
| 2-Nitroethanol | 0.05 | ___do___ | Do. |
| 2-Nitro-1-propanol | 0.25 | ___do___ | Do. |
| None (Control) | None | ___do___ | Heavy. |
| 2-Nitro-1-butanol | 0.25 | Lytron 615 [3] | None. |
|  | 0.1 | ___do___ | Do. |
| 2-Ethyl-1-nitro-1,3-propanediol | 0.25 | ___do___ | Do. |
|  | 0.1 | ___do___ | Trace. |
|  | 0.05 | ___do___ | Do. |
| 2-Nitro-1-propanol | 0.25 | ___do___ | None. |
|  | 0.05 | ___do___ | Do. |
| None (Control) | None | ___do___ | Moderate. |
| 2-Nitroethanol | 0.25 | Elvacet 81-900 [4] | None. |
|  | 0.1 | ___do___ | Do. |
|  | 0.05 | ___do___ | Do. |
| 2-Nitro-1-propanol | 0.25 | ___do___ | Do. |
|  | 0.1 | ___do___ | Do. |
|  | 0.05 | ___do___ | Do. |
| None (Control) | None | ___do___ | Heavy. |

[1] Commercial acrylonitrile-butadiene copolymer.
[2] Commercial vinyl chloride-acrylic ester copolymer.
[3] Commercial polystyrene.
[4] Commercial polyvinylacetate.

EXAMPLE 5

In a similar manner, commercially available synthetic latexes were modified by the addition of aliphatic nitroalcohol and inoculated as above described. The inoculated samples were maintained at about 25° C. for varying intervals, and then streaked, incubated and observed as described in Example 1. The results are set forth in Table V.

Table V

| Nitroalcohol | Concentration in Percent by Weight | Latex | Interval After Incubation, Weeks | Microbial Growth |
|---|---|---|---|---|
| 2-Nitro-1-butanol | 0.25 | Hycar 1562 | 1 | None. |
|  | 0.05 | ___do___ | 2 | Do. |
|  | 0.1 | ___do___ | 1 | Do. |
|  | 0.1 | ___do___ | 2 | Do. |
|  | 0.05 | ___do___ | 1 | Trace. |
|  | 0.05 | ___do___ | 2 | Do. |
| 2-Ethyl-2-nitro-1,3-propanediol | 0.25 | ___do___ | 1 | None. |
|  | 0.25 | ___do___ | 2 | Do. |
|  | 0.1 | ___do___ | 1 | Do. |
|  | 0.1 | ___do___ | 2 | Do. |
|  | 0.05 | ___do___ | 1 | Do. |
|  | 0.05 | ___do___ | 2 | Do. |
| 2-Nitroethanol | 0.25 | ___do___ | 1 | Do. |
|  | 0.25 | ___do___ | 2 | Do. |
|  | 0.1 | ___do___ | 1 | Do. |
|  | 0.1 | ___do___ | 2 | Do. |
|  | 0.05 | ___do___ | 1 | Do. |
|  | 0.05 | ___do___ | 2 | Do. |
| 2-Nitro-1-propanol | 0.25 | ___do___ | 1 | Do. |
|  | 0.25 | ___do___ | 2 | Do. |
|  | 0.1 | ___do___ | 1 | Do. |
|  | 0.1 | ___do___ | 2 | Do. |
|  | 0.05 | ___do___ | 1 | Do. |
|  | 0.05 | ___do___ | 2 | Do. |
| None (Control) | None | ___do___ | 1 | Heavy. |
|  | None | ___do___ | 2 | Do. |
| 2-Nitro-1-butanol | 0.25 | Rhoplex AC-33 [1] | 1 | Trace. |
|  | 0.25 | ___do___ | 2 | Do. |
|  | 0.1 | ___do___ | 1 | Do. |
|  | 0.1 | ___do___ | 2 | Do. |
| 2-Nitroethanol | 0.25 | ___do___ | 1 | None. |
|  | 0.25 | ___do___ | 2 | Do. |
|  | 0.1 | ___do___ | 1 | Do. |
|  | 0.1 | ___do___ | 2 | Do. |
|  | 0.05 | ___do___ | 1 | Do. |
|  | 0.05 | ___do___ | 2 | Do. |
| 2-Nitro-1-propanol | 0.25 | ___do___ | 1 | Do. |
|  | 0.25 | ___do___ | 2 | Do. |
|  | 0.1 | ___do___ | 1 | Do. |
|  | 0.1 | ___do___ | 2 | Do. |
| None (Control) | None | ___do___ | 1 | Heavy. |
|  | None | ___do___ | 2 | Do. |

[1] Commercial ethyl acrylate-methyl methacrylate copolymer.

EXAMPLE 6

A commercially available synthetic styrene-butadiene copolymer latex (Dow Latex 512-R) of approximately 48 percent solids content and having a monomer ratio of 60 percent styrene and 40 percent butadiene was modified by adding various nitroalcohols. Each modified composition contain 0.1 percent by weight of a particular nitroalcohol. The pH of each sample was adjusted to 8.5 by bubbling carbon dioxide therethrough. Fifty gram portions of the various modified latex compositions as well as unmodified latex composition were inoculated with 0.1 milliliter of a mixed culture of organisms as described in Example 1. The inoculated samples were maintained at about 25° C. and at various intervals after inoculation, multiple streaks were made from these samples on agar plates and the latter incubated and observed as previously described. The results are set forth in Table VI.

Table VI

| Nitroalcohol | Interval After Inoculation | Microbial Growth |
|---|---|---|
| 2-Nitro-1-butanol | 24 hours | None. |
|  | 1 week | Do. |
|  | 2 weeks | Do. |
| 2-Methyl-2-nitro-1,3-propanediol | 24 hours | Do. |
|  | 1 week | Do. |
|  | 2 weeks | Do. |
| 2-Methyl-2-nitro-1-propanol | 24 hours | Do. |
|  | 1 week | Do. |
|  | 2 weeks | Do. |

Unmodified samples show heavy growth at all three intervals.

EXAMPLE 7

In a similar experiment, a commercially available synthetic styrene-butadiene copolymer latex (Dow Latex 762-W) of approximately 48 percent solids content and having a monomer ratio of 67 percent styrene and 33 percent butadiene was modified by adding various nitroalcohols of varying composition and the pH adjusted to 8.5. Fifty gram portions of the various modified latex compositions as well as unmodified latex composition were inoculated, streaked, incubated and observed as previously described. The results are as follows:

Table VII

| Nitroalcohol | Concentration in Percent by Weight | Interval After Inoculation, Weeks | Microbial Growth |
|---|---|---|---|
| 1-Nitro-2-butanol | 0.5 | 1 | None. |
|  | 0.5 | 2 | Do. |
|  | 0.1 | 1 | Do. |
|  | 0.1 | 2 | Do. |
|  | 0.01 | 1 | Do. |
|  | 0.01 | 2 | Do. |
| 3-Nitro-2-butanol | 0.1 | 1 | Do. |
|  | 0.1 | 2 | Do. |
| 3-Methyl-3-nitro-2-butanol | 0.1 | 1 | Do. |
|  | 0.1 | 2 | Do. |
| 2-Methyl-2-nitro-3-hexanol | 0.5 | 1 | Do. |
|  | 0.5 | 2 | Do. |
| 3-Nitro-4-heptanol | 0.5 | 1 | Do. |
|  | 0.5 | 2 | Do. |
| 2,2-Dimethyl-3-((2-methyl-2-nitropropyl)amino)-1-propanol | 0.5 | 1 | Do. |
|  | 0.5 | 2 | Do. |
| Control | None | 1 | Heavy. |
|  | None | 2 | Do. |

EXAMPLE 8

A latex paint formulation employing a synthetic GRS type latex comprising a copolymer of 50 percent styrene and 50 percent butadiene and prepared as previously described is modified by adding the following aliphatic nitroalcohols in the concentrations indicated.

| Aliphatic Nitroalcohol | Concentration in Percentage by Weight |
| --- | --- |
| 2-Nitro-2-butanol | 0.08 |
| 2-Nitroethanol | 0.06 |
| 2-Methyl-1-nitro-2-propanol | 0.04 |
| 2-Nitro-1,3-propanediol | 0.03 |

Each modified paint sample as well as an unmodified paint sample is inoculated with a mixed culture of organisms previously described and maintained, streaked and incubated as previously described. On observation of the streaks after a period of incubation, no growth is noted on the streaks made from samples of modified paint but heavy growth is noted on streaks made from samples of unmodified paint.

EXAMPLE 9

An operation is carried out in a manner similar to that described in Example 8 but wherein the paint sample is modified with varying concentrations of 2,2-dimethyl-3-(2-methyl-2-nitropropyl)amino-1-propanol.

CONCENTRATION IN PERCENT BY WEIGHT 0.03
0.04
0.05
0.06
0.07
0.08

The streaks from modified paint samples show no growth of microorganisms whereas streaks from unmodified paint samples show heavy growth of microorganisms.

EXAMPLE 10

A latex paint was made by intimately blending in a conventional manner a pigment dispersion with a synthetic latex and other paint formulation ingredients as described below:

| Composition | Parts by Weight (Lbs./100 gals.) |
| --- | --- |
| Titanium dioxide | 250 |
| Calcium carbonate | 50 |
| Clay | 50 |
| Diatomaceous earth | 25 |
| Ultramarine Blue | 0.25 |
| Potassium tripolyphosphate | 1.5 |
| Water | 144 |
| Antifoamer [1] | 10.0 |
| Casein 15 percent, Ammonia cut [2] | 75 |
| Synthetic latex [3] +4.0 parts/100 parts of total solids emulsifier [4] (34.4 percent solids) | 479 |

[1] Nopco 1407 (20 percent solution), a blend of non-ionic and anionic surface active materials predominantly non-ionic (partially saponified, sulfated-sulfonated aliphatic ester).
[2] Casein solution is prepared by dispersing 15 parts casein in 82.5 parts of water and heating to 65° C., agitating for 15 minutes, adding 2.5 parts of aqueous 28 percent ammonium hydroxide solution and maintaining at that temperature while agitating for 30 minutes, then cooling.
[3] A 50 percent vinyltoluene-50 percent butadiene copolymer of about 34 percent solids content.
[4] Igepal CO-630, an alkyl aryl polyethylene glycol ether.

A water-emulsion paint employing a synthetic latex and having the formulation above described was modified by adding various aliphatic nitroalcohols. The modified compositions contained varying concentrations of aliphatic nitroalcohol in percent by weight. Twenty-five gram samples of latex paint were inoculated with 0.1 milliliter of a mixed culture of organisms as previously described and the modified as well as the unmodified paints were then incubated at 30° C. for 48 hours. Multiple streaks were made from these samples on poured nutrient agar plates and incubated for 48 hours at 30° C. The following table sets forth the results.

Table IX

| Nitroalcohol | Concentration in Percent by Weight | Microbial Growth |
| --- | --- | --- |
| 1-Nitro-2-butanol | 0.05 | None. |
| 2-Nitro-1-propanol | 0.05 | Do. |
| 3-Methyl-3-nitro-2-butanol | 0.2 | Slight. |
| 2-Methyl-2-nitro-3-hexanol | 0.2 | Do. |
| Control | None | Heavy. |

EXAMPLE 11

A water emulsion paint was made by intimately blending in a conventional manner 100 grams of a pigment dispersion of the following composition:

| Ingredient | Amount |
| --- | --- |
| Water milliliters | 807 |
| Sodium pyrophosphate ($Na_4P_2O_7 \cdot 10H_2O$) grams | 43.44 |
| Titanium dioxide do | 3,726 |
| Lithopone do | 1,064.4 |
| Ground Mica do | 529.8 |
| α-Protein (10 percent) do | 1,515.6 |
| Pine Oil do | 63.3 |
| Tributyl phosphate do | 201 | with 69 milliliters of a 48 percent solids synthetic latex of a copolymer of 60 percent styrene and 40 percent butadiene (Dow Latex 512K). This latex paint composition was modified to give compositions containing an aliphatic nitroalcohol in varying concentrations. Fifty gram samples of modified paint was inoculated with 0.1 milliliter of a mixed culture of organisms, streaked, incubated, and observed as described in Example 1. The results were as follows:

Table X

| Nitroalcohol | Concentration in Percent by Weight | Interval After Inoculation, weeks | Microbial Growth |
| --- | --- | --- | --- |
| 2-Ethyl-2-nitro-1,3-propanediol | 0.1 | 1 | None. |
|  | 0.1 | 2 | Do. |
|  | 0.075 | 1 | Do. |
|  | 0.075 | 2 | Do. |
|  | 0.05 | 1 | Do. |
|  | 0.05 | 2 | Do. |

Latex paint samples unmodified with nitroalcohol show heavy microbial growth at 1 and 2 week intervals.

We claim:

1. An aqueous colloidal dispersion comprising (1) a synthetic latex containing in the disperse phase a polymer obtained by polymerizing an olefinically unsaturated monomer and (2) from about 0.002 to 1 percent by weight of an aliphatic nitroalcohol, said nitroalcohol containing from 1 to 2 hydroxyl radicals per molecule and containing no more than 8 carbon atoms in an uninterrupted carbon chain and wherein the amount is based on the total weight of the aqueous colloidal dispersion.

2. An aqueous colloidal dispersion comprising (1) a synthetic latex containing in the disperse phase a copolymer of a conjugated diolefin and a vinyl-aromatic compound of the benzene series and (2) from about 0.002 to 1 percent by weight of an aliphatic nitroalcohol, said nitroalcohol containing from 1 to 2 hydroxyl radicals per molecule and containing no more than 8 carbon atoms in an uninterrupted carbon chain and wherein the amount is based on the total weight of the aqueous colloidal dispersion.

3. An aqueous colloidal dispersion comprising (1) a synthetic latex containing in the disperse phase a copolymer of from 25 to 75 percent by weight of butadiene and correspondingly from 75 to 25 percent by weight of a vinyl-aromatic hydrocarbon of the benzene series, and (2) from about 0.002 to 1 percent by weight of an aliphatic nitroalcohol, said nitroalcohol containing from 1 to 2 hydroxyl radicals per molecule and containing no more than 8 carbon atoms in an uninterrupted carbon chain and wherein the amount is based on the total weight of the aqueous colloidal dispersion.

4. An aqueous colloidal dispersion comprising a synthetic latex containing in the disperse phase a polymer obtained by polymerizing an olefinically unsaturated monomer and having intimately blended therein from about 0.002 to 1 percent by weight of an aliphatic nitroalcohol wherein the amount is based on the total weight of the aqueous colloidal dispersion.

5. An aqueous colloidal dispersion comprising a synthetic latex containing in the disperse phase a polymer obtained by polymerizing an olefinically unsaturated monomer and having intimately blended therein from 0.01 to 0.5 percent by weight of an aliphatic nitroalcohol, said nitroalcohol containing from 1 to 2 hydroxyl radicals per molecule and containing no more than 8 carbon atoms in an uninterrupted carbon chain and wherein the amount is based on the total weight of the aqueous colloidal dispersion.

6. An aqueous colloidal dispersion comprising a synthetic latex containing in the disperse phase a polymer obtained by polymerizing an olefinically unsaturated monomer and having intimately blended therein from about 0.002 to 1 percent by weight of 2-nitroethanol wherein the amount is based on the total weight of the aqueous colloidal dispersion.

7. An aqueous colloidal dispersion comprising a synthetic latex containing in the disperse phase a polymer obtained by polymerizing an olefinically unsaturated monomer and having intimately blended therein from about 0.002 to 1 percent by weight of 2-nitro-1-butanol wherein the amount is based on the total weight of the aqueous colloidal dispersion.

8. An aqueous colloidal dispersion comprising a synthetic latex containing in the disperse phase a polymer obtained by polymerizing an olefinically unsaturated monomer and having intimately blended therein from about 0.002 to 1 percent by weight of 2-methyl-2-nitro-1,3-propanediol wherein the amount is based on the total weight of the aqueous colloidal dispersion.

9. An aqueous colloidal dispersion comprising a synthetic latex containing in the disperse phase a polymer obtained by polymerizing an olefinically unsaturated monomer and having intimately blended therein from about 0.002 to 1 percent by weight of 2-ethyl-2-nitrol-1,3-propanediol wherein the amount is based on the total weight of the aqueous colloidal dispersion.

10. An aqueous colloidal dispersion comprising a synthetic latex containing in the disperse phase a polymer obtained by polymerizing an olefinically unsaturated monomer and having intimately blended therein from about 0.002 to 1 percent by weight of 2,2-dimethyl-3-(2-methyl-2-nitropropyl) amino-1-propanol wherein the amount is based on the total weight of the aqueous colloidal dispersion.

11. A latex paint composition consisting of an aqueous colloidal dispersion comprising (1) a pigment, (2) a synthetic latex containing in the dispersed phase a polymer obtained by polymerizing an olefinically unsaturated monomer, and (3) from about 0.03 to 1 percent by weight of an aliphatic nitroalcohol, said nitroalcohol containing from 1 to 2 hydroxyl radicals per molecule and containing no more than 8 carbon atoms in an uninterrupted carbon chain and wherein the amount is based on the total weight of the latex paint.

12. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinyl-aromatic hydrocarbon of the benzene series, and (3) from about 0.03 to 1 percent by weight of an aliphatic nitroalcohol, said nitroalcohol containing from 1 to 2 hydroxyl radicals per molecule and containing no more than 8 carbon atoms in an uninterrupted carbon chain and wherein the amount is based on the total weight of latex paint.

13. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinyl-aromatic hydrocarbon of the benzene series, and (3) from about 0.05 to 1 percent by weight of an aliphatic nitroalcohol, said nitroalcohol containing from 1 to 2 hydroxyl radicals per molecule and containing no more than 8 carbon atoms in an uninterrupted carbon chain and wherein the amount is based on the total weight of latex paint.

14. A method for rendering an aqueous colloidal dispersion comprising synthetic latexes resistant to microbiological degradation, said synthetic latex containing in the disperse phase a polymer obtained by polymerizing an olefinically unsaturated monomer, which comprises the step of intimately blending into the aqueous colloidal dispersion an aliphatic nitroalcohol in an amount of from about 0.002 to 1 percent by weight based on the total weight of aqueous colloidal dispersion and wherein said nitroalcohol contains from 1 to 2 hydroxyl radicals per molecule and contains no more than 8 carbon atoms in an uninterrupted carbon chain.

15. A method for rendering latex paint compositions resistant to microbially induced degradation, said latex paint composition comprising a synthetic latex containing in the disperse phase a polymer obtained by polymerizing an olefinically unsaturated monomer, which comprises blending into the latex paint composition during its manufacture an aliphatic nitroalcohol in an amount of from 0.03 to 1 percent by weight based on the total weight of latex paint and wherein said nitroalcohol contains from 1 to 2 hydroxyl radicals per molecule and contains no more than 8 carbon atoms in an uninterrupted carbon chain.

References Cited in the file of this patent

UNITED STATES PATENTS

| | | |
|---|---|---|
| 2,231,458 | Trowell | Feb. 11, 1941 |
| 2,426,128 | Trowell | Aug. 19, 1947 |